United States Patent Office 3,016,346
Patented Jan. 9, 1962

3,016,346
HYDRODESULFURIZATION PROCESS AND
CATALYST THEREFOR
Mark J. O'Hara, Chicago, Ill., assignor to Universal Oil Products Company, Des Plaines, Ill., a corporation of Delaware
No Drawing. Filed May 25, 1960, Ser. No. 31,545
6 Claims. (Cl. 208—216)

The present application is a continuation-in-part of my copending application, Serial No. 841,402, filed September 21, 1959. The present invention relates to processes for the purification, or treating, of hydrocarbons and hydrocarbon fractions, and is particularly directed toward the utilization of an improved hydrodesulfurization catalyst to remove various contaminants from the hydrocarbons and/or hydrocarbon fractions being processed.

In one embodiment, the present invention involves the purification of a hydrocarbon mixture containing olefinic hydrocarbons, and further contaminated with sulfurous and nitrogenous compounds, through the utilization of a particular catalytic composite which has been prepared in a particular manner. The catalytic composite, for utilization in the present invention, is at least a 4-component catalyst, and it is necessary that the catalytically active metallic components exist in the sulfided state prior to any contact with the particular hydrocarbons being treated. Accordingly, an essential feature of the present invention involves the utilization of a particular combination of manufacturing procedures in preparing the sulfided hydrodesulfurization catalyst for use therein.

The purification process of the present invention may be utilized to great advantage in the production of saturated charge stocks which are substantially free from combined sulfur and nitrogen, and are highly adaptable for utilization in other processes. It is especially advantageous, within the petroleum industry, to reform catalytically various straight run gasolines, natural gasolines, catalytically cracked naphtha fractions, and/or thermally cracked hydrocarbon distillates, for the primary purpose of improving the anti-knock characteristics thereof. Relatively recent developments within the refining industry have shown that catalytic reforming processes which utilize a catalyst consisting primarily of platinum and alumina, are especially useful in the reforming of hydrocarbon fractions of the type hereinbefore set forth. Such a catalyst effects a highly desirable combination of reactions including the hydrocracking and isomerization of paraffins to a controlled degree, the dehydrogenation of naphthenes to aromatics, and the dehydrocyclization of paraffins to aromatics, and is thus especially efficient in increasing the octane rating, or anti-knock characteristics, of such hydrocarbon fractions. The platinum-containing catalyst, through the proper selection of operating conditions, may be employed for a relatively extended period of time when processing those hydrocarbons and mixtures of hydrocarbons which are comparatively free from various contaminants. However, when effecting the foregoing reactions, while processing charge stocks containing excessive concentrations of contaminants, there results a selective poisoning of the catalyst, accompanied by a significant decline in the activity and stability thereof. The most common contaminants, generally contained within a charge stock designated to be subjected to a catalytic reforming operation, are olefinic hydrocarbons, and sulfurous and nitrogenous compounds. When such a charge stock is caused to contact the platinum-containing reforming catalyst, the combined sulfur and nitrogen are released from their respective hydrocarbon molecules, and are ultimately absorbed, at least in part, onto and within the reforming catalyst. Such absorption results in a decline in catalytic activity, in addition to the normal activity decline resulting from the inherent deposition of coke and other heavy hydrocarbonaceous material which shields the catalytically active surfaces and centers of the catalyst from the material being processed. Elimination of the difficulties which arise as a result of the presence of various contaminants within the charge stock, has been achieved with a fair degree of success through the use of a suitable hydrodesulfurization catalyst at particular conditions of operation, whereby metallic contaminants are removed, combined sulfur and nitrogen are converted to hydrogen sulfide and ammonia, and olefinic hydrocarbons are saturated to form paraffins and naphthenes.

As hereinbefore stated, the catalytic reforming process greatly improves the characteristics of gasoline fractions through a combination of reactions including dehydrogenation to form aromatic hydrocarbons, isomerization of straight-chain hydrocarbons to form more highly-branched chain hydrocarbons, dehydrocyclizing of straight or slightly-branched chain hydrocarbons to form additional aromatic hydrocarbons, and selective hydrocracking of heavier molecules to form the more desirable lighter molecules boiling within the gasoline boiling range. It becomes difficult to effect a successful reforming process on a highly unsaturated charge stock containing large quantities of sulfurous and nitrogenous compounds; the unsaturated compounds exhibit the tendency to polymerize and form a highly carbonaceous material which becomes deposited upon the reforming catalyst. As hereinbefore stated, the sulfur and nitrogen compounds are caused to form hydrogen sulfide and ammonia, both of which exhibit adverse effects toward the reforming catalyst. A primary object of the present invention is to provide a process for the purification of contaminated hydrocarbons and mixtures of hydrocarbons, such that these hydrocarbons are extremely well suited as charge material to the catalytic reforming process. The process of the present invention affords additional advantages when integrated in combination with a catalytic reforming process which utilizes a platinum-containing composite. The process of the present invention also affords advantages to the purification of hydrocarbon fractions, such as light cycle stocks, boiling in excess of the normal gasoline boiling range, which cycle stocks are generally employed as fuel oils. An essential feature of the present invention, by which the above object is attained, is the utilization of a particular catalyst prepared in a particular manner.

In a broad embodiment, the present invention relates to a process for the purification of hydrocarbons and mixtures of hydrocarbons, containing undesirable contaminants, which comprises contacting said hydrocarbons, in a hydrogenation reaction zone, with a hydrodesulfurization catalyst containing at least one metallic component selected from the metals of groups VI-A and VIII of the periodic table, and existing as the sulfides thereof, composited with an alumina-titania carrier material; removing a mixture of normally gaseous material and saturated, normally liquid hydrocarbons from said hydrogenation reaction zone, and thereafter separating said mixture into a gaseous phase and a liquid phase substantially free from the aforesaid undesirable contaminants.

More particularly, the present invention affords a process for the purification of hydrocarbons and mixtures of hydrocarbons, contaminated by sulfurous and nitrogenous compounds, which comprises passing said contaminated hydrocarbons into a hydrogenation reaction zone, maintained under an imposed hydrogen pressure in excess of about 100 pounds per square inch, and containing a hydrodesulfurization catalyst consisting of the sulfides of molybdenum, nickel and cobalt composited with an alumina-titania carrier material; removing a mixture of normally liquid hydrocarbons and normally gaseous material, containing hydrogen sulfide and ammonia, from said hydrogenation reaction zone, thereafter separating said mixture to remove the normally gaseous material and to recover said liquid hydrocarbons substantially free from the aforesaid sulfurous and nitrogenous compounds; the hydrosulfurization catalyts being characterized by the method of preparation which comprises sulfiding an alumina-titania carrier material composited with the oxides of molybdenum, nickel and from about 0.1% to about 0.7% by weight of cobalt, with hydrogen sulfide containing hydrogen in a mol ratio of about 1.5:1 to about 4:1 with respect to said hydrogen sulfide.

An essential feature of the present invention is the method of preparing the hydrodesulfurization catalytic composite, which method comprises initially forming an alumina-titania carrier material containing from about 0.1% to about 0.7% by weight of cobalt, compositing molybdenum with said cobalt-containing carrier material in an amount of from about 5% to about 10% by weight, and nickel in an amount of from about 1% to about 5% by weight, oxidizing the resulting mixture to form an alumina-titania-molybdenum oxide-nickel oxide-cobalt oxide composite, and thereafter sulfiding the resulting oxidized composite over a temperature range of from about 400° F. to about 800° F. with a gaseous mixture of hydrogen sulfide containing hydrogen in a mol ratio of about 1.5:1 to about 4:1 with respect to said hydrogen sulfide.

A more limited embodiment of the present invention is specifically directed toward a process for the purification of olefin-containing hydrocarbons and mixtures of olefin-containing hydrocarbons, contaminated by sulfurous and nitrogenous compounds, which comprises passing said olefin-containing hydrocarbons at a liquid hourly space velocity (defined as volumes of hydrocarbon charge per unit of time per volume of catalyst disposed within the reaction zone) of from about 1.0 to about 20.0, and in the presence of compressive recycle hydrogen in an amount of from about 1000 to about 5000 standard cubic feet per barrel of said hydrocarbons, in a hydrogenation reaction zone maintained under an imposed pressure of from about 100 pounds per square inch to about 1000 pounds per square inch and at an inlet temperature thereto within the range of about 200° F. to about 750° F., said hydrogenation reaction zone containing a hydrodesulfurization catalyst consisting of an alumina-titania carrier material with which have been composited the sulfides of molybdenum, nickel and cobalt, removing a mixture of normally liquid, saturated hydrocarbons and normally gaseous material containing hydrogen sulfide and ammonia from said hydrogenation reaction zone, thereafter separating the normally gaseous material from said mixture and recovering said liquid saturated hydrocarbons substantially free from the aforesaid sulfurous and nitrogenous compounds; said hydrodesulfurization catalyst characterized by the method of preparation which comprises initially forming an alumina carrier material to contain cobalt in an amount of from about 0.1% to about 0.7% by weight and titania in an amount of from about 0.5% to about 5.0% by weight, impregnating said cobalt-containing carrier material with an aqueous solution of molybdenum and nickel compounds to composite therewith from about 5% to about 10% by weight of molybdenum and from about 1% to about 5% by weight of nickel, oxidizing the thus impregnated composite to form an alumina-titania-molybdenum oxide-nickel oxide-cobalt oxide composite, sulfiding the oxidized composite over a temperature range of about 400° F. to about 800° F. with a gaseous mixture of hydrogen sulfide containing hydrogen in a mol ratio of about 1.5:1 to about 4:1 with respect to said hydrogen sulfide, and maintaining the thus sulfided hydrodesulfurization catalyst under a positive pressure of hydrogen sulfide of from about 5 to about 15 pounds per square inch while the sulfided catalyst is being cooled to a temperature below about 400° F.

The catalytic composite, provided by this invention in one of its principal embodiments, is characterized by a particular combination of carrier material and catalytically active metallic components. The term, "catalytically active metallic component," connotes those components of the catalyst selected from the metals of groups VI–A and VIII of the periodic table, and particularly group VI–A and the iron-group of the periodic table. In this manner, the active components of the catalyst are distinguished from those components which are employed primarily as a solid support, or carrier material for the catalytically active metallic components. The carrier material employed in the hydrodesulfurization catalyst comprises alumina as the major component, and titania in an amount of from about 0.5% to about 5.0% by weight, based upon the total weight of the carrier material. The alumina-titania composite supports reductively sulfided oxides of molybdenum and nickel, and has a molybdenum content of not more than about 10% by weight of the final catalyst, and a nickel content which is substantially less than that of the molybdenum. The reductively sulfided state of the aforesaid oxides of molybdenum and nickel being that sulfided state which results from the treatment of the composite of said oxides and alumina-titania carrier material, with a mixture of hydrogen sulfide and hydrogen which contacts said composite over a temperature range of from about 400° F. to about 800° F., substantially in the absence of hydrocarbons. Furthermore, in a particularly preferred embodiment, this catalytic composite has a cobalt content substantially less than the nickel content and within the range of from about 0.1% to about 0.7% by weight, the cobalt content being in the form of cobalt oxide (although calculated on the basis of elemental cobalt) which has been converted to the aforesaid reductively sulfided state.

Various processes for effecting the hydrogenation of unsaturated hydrocarbons and hydrocarbon fractions, which processes are shown to effect at least a partially successful pretreatment, or purification, of such hydrocarbons, are well known and well defined within the prior art. Generally these processes utilize a hydrogenation catalyst consisting essentially of an alumina carrier material which has been combined with catalytically active metallic components of cobalt and molybdenum. The prior art further indicates a wide variety of methods for the preparation of such catalytic composites, as well as a relatively wide range in the composition thereof. The various methods employed for the preparation of the cobalt and molybdenum-containing catalyst include single and double impregnations of the active metallic components, drying and calcination procedures at various elevated temperatures, reduction treatments, the utilization of various reagents in the impregnating procedure to yield a final composite in which the metallic components exist in some desired, combined form, etc. Although the hydrogenation processes employing these cobalt and molybdenum-containing catalysts may be advantageously utilized in treating various hydrocarbons, they fall substantially short of fulfilling the present-day requirements which have been imposed on these processes as a result of the great demand for high quality distillate fuels and catalytically reformed products in large volumetric yield. This demand has brought about a certain degree of criticality, especially in regard to the condition of the particular hydrocarbon charge stock employed within the catalytic reforming process. As previously stated, the platinum-alumina catalyst, widely utilized in various catalytic reforming processes, is detrimentally affected by seemingly insignificant quantities of sulfurous, nitrogenous and olefinic hydrocarbons. As a direct result of the emphasis placed upon the catalytic reforming processes, due to the increased demand for catalytically reformed products in large liquid volumetric yield, there has been created the necessity of insuring an extended, successful period of operation of such processes. The successful operation of any catalytic process is, obviously, dependent to a large extent upon the acceptable performance of the catalytic composite employed therein over a prolonged period of time. One particular means of obtaining this insurance is the preparation, or pretreatment, of the hydrocarbon charge stock for the purpose of removing those contaminants which deleteriously affect the reforming catalyst. The present-day pretreating processes and purification catalyst of the prior art are insufficiently capable of treating the charge stocks to the extent that the same became sufficiently acceptable for utilization in current catalytic reforming processes. Due to the operating demands, which have been placed upon the catalyst employed within the reforming process, the tolerable degree of concentration of the various contaminants, previously described, has been lessened significantly. In short, the processes and hydrogenation catalysts of the prior art no longer suffice to prepare the charge stock to the extent which is now considered suitable for further processing in a catalytic reforming unit.

The process of the present invention utilizes at least a 4-component catalyst comprising an alumina-titania carrier material which has been impregnated with particular quantities of at least one metallic component selected from the metals of groups VI–A and VIII of the periodic table and mixtures thereof. Thus, although not necessarily with equivalent results, the catalyst of the present invention may comprise chromium, molybdenum, tungsten, iron, cobalt, nickel, minor quantities of the metals from the platinum-group, and mixtures thereof. Nickel and molybdenum are particularly preferred, and the method of preparation is such that these components exist within the final catalytic composite as the sulfides thereof. I have further found that a 5-component catalyst, the fifth component being a minor quantity of cobalt, in addition to the nickel, molybdenum, aluminum and titania, may be utilized to greater advantage in processing hydrocarbon charge stocks designed to be utilized in the catalytic reforming process, as well as the purification of various heavy naphthas and cycle stocks which are to be utilized as fuel and lubricating oils. Whether the 4-component or 5-component catalyst is employed within the present process, an essential feature of my invention involves the preparation of the catalyst through the utilization of a precise combination of particular manufacturing procedures.

The most common contaminants, as hereinbefore set forth, which are found in the various hydrocarbons and hydrocarbon distillates, especially from the standpoint of utilizing such charge stock in a catalytic reforming process, are olefinic hydrocarbons, nitrogenous compounds, and sulfurous compounds. With respect to these contaminants, the hydrogenation of the olefinic hydrocarbons to yield paraffins and cycloparaffins, is most readily effected; the conversion of the sulfurous compounds into the hydrocarbon counterpart and hydrogen sulfide is but slightly more difficult, whereas the removal of nitrogenous compounds, through the conversion of the same into the hydrocarbon counterpart and ammonia, is the most difficult to obtain. The degree of success, in regard to the elimination of nitrogenous compounds is dependent upon many considerations including the quantity thereof within the hydrocarbon being processed, the various physical and/or chemical characteristics of the hydrocarbon charge stock, and the concentration therein of the olefinic hydrocarbons and the sulfurous hydrocarbons. It appears that the hydrogenation catalyst suffers a loss of activity for removing nitrogenous compounds as the removal of the olefinic and sulfurous hydrocarbons progresses. Notwithstanding the known difficulty of effecting the substantially complete removal of nitrogenous compounds, the activity of the four and 5-component catalyst of the present invention is virtually twice that exhibited by the widely utilized alumina-cobalt-molybdenum catalyst. The increased removal of nitrogen results in a definite improvement in subsequent catalytic reforming operations, particularly from the standpoint of enabling the catalyst to function acceptably over a prolonged period of time; it also permits the inclusion of greater quantities of cracked gasolines within the charge stocks to such reforming processes. In the case of intermediate naphthas, such as kerosenes, middle distillates and light and heavy gas oils, the greater removal of nitrogen compounds affords improved color and storage stability since nitrogenous compounds exhibit the tendency to form gums and varnishes. The activity of the catalyst of the present invention, in regard to the removal of sulfurous compounds, as well as the hydrogenation of olefinic hydrocarbons, is also significantly greater than that of the presently utilized hydrogenation catalyst.

The carrier material of the present invention, employed to support the reductively sulfided oxides of nickel, molybdenum and/or cobalt, consists essentially of alumina combined with from about 0.5% to about 5.0% by weight of titania. Alumina, when used as the carrier material in the preparation of catalytic composites, is often combined with other refractory inorganic oxides, and quite commonly with various quantities of silica. A particular disadvantage exists in the use of an alumina-silica composite for utilization in hydrodesulfurization, or treating catalysts, in that the combination of silica and alumina readily promotes hydrocracking reactions at the temperatures necessarily employed in treating processes. Since treating processes are primarily concerned with the removal of contaminants, the change in boiling range of the final product, as a result of the uninhibited hydrocracking, is undesirable from the standpoint of yield loss due to the formation of light paraffinic, normally gaseous hydrocarbons. The use of titania, in substantially lesser proportions than silica, affords the benefits of the combination, without the usual attendant excessive hydrocracking. Furthermore, the formation of spherical particles of alumina-silica is notoriously difficult to effect when employing relatively high concentrations of silica; through the use of titania, suitable spherical particles may be formed, the titania added subsequently, and no material change in the physical characteristics of the particles is effected. Or, the titania may be incorporated prior to spherical particle formation, and its presence does not detrimentally affect the process of formation. Of greater significance, however, is the fact that titania appears to yield a catalyst having a greater propensity for the removal of the previously described contaminants, particularly the nitrogenous compounds.

Briefly, the particularly preferred embodiment of the present invention utilizes a 5-component catalyst consisting of a carrier material comprising alumina and from about 0.5% to about 5.0% by weight of titania, with which has been composited molybdenum, nickel and cobalt, the latter existing as the sulfides thereof prior to contact with the particular hydrocarbon mixture to be treated. This 5-component catalyst is prepared by initially co-precipitating the alumina-titania carrier material to contain the desired quantity of cobalt, within the range of about 0.1% to about 0.7% by weight, forming the carrier material into the desired size and shape, and impregnating the formed carrier material with a single impregnating solution containing suitable water-soluble molybdenum and nickel compounds. Following this single impregnating procedure, the resulting alumina-titania composite, containing cobalt, molybdenum and nickel, is calcined in an atmosphere of air to convert the catalytically active metallic components to the oxides thereof. The oxidized composite is then subjected to a sulfiding technique by first being cooled to a temperature of about 400° F. and contacted at this temperature with a gaseous sulfiding medium comprising hydrogen and hydrogen sulfide, the hydrogen being present in the greater concentration. The temperature of the composite during the initial sulfiding procedure is increased to a level of about 750° F. or 800° F., and the sulfiding continued at this temperature for a period of about one hour. Following the complete sulfidation of the catalytically active metallic components, hydrogen sulfide is introduced intermittently to maintain a positive pressure thereof on the sulfided catalyst, while the latter is being cooled to a temperature below about 400° F. At this stage in the manufacturing procedure, a stream of suitable inert gaseous material, such as nitrogen, may be employed to cool the sulfided catalyst further in order to facilitate handling and storage. Various modifications of this procedure may be employed to yield a catalytic composite possessing a high degree of activity in regard to the removal of sulfurous and nitrogenous compounds, in addition to the saturation of olefinic hydrocarbons. Such modifications include the preparation of a 4-component catalyst, differing from the 5-component catalyst in the omission of the cobalt component therefrom. Both single and double impregnating techniques may be employed; that is, the active metallic components may be individually and separately composited with the alumina-titania carrier material while employing calcination procedures following each individual impregnation. The order in which the metallic components are combined may be altered without removing the method of manufacture from the broad scope of the present invention. In addition, various sulfiding techniques may be employed, however, the more active catalysts are produced by the method which comprises contacting the catalyst with a mixture of hydrogen sulfide and hydrogen at a comparatively low temperature, and maintaining such contact while the catalyst is being heated to the elevated temperature at which the greater portion of sulfidation takes place. As hereinafter indicated, additional beneficial results are obtained when a positive pressure of hydrogen sulfide is maintained on the catalyst while the latter is being cooled from the elevated sulfiding temperature, about 800° F., to a temperature below about 400° F. The preferred embodiment of the present invention employs a mixture of hydrogen and hydrogen sulfide, as the sulfiding medium, in which mixture the hydrogen is predominating and within a mol ratio range of about 1.5:1 to about 4:1, and more advantageous results are obtained with gaseous media in which the hydrogen is present within the mol ratio range of about 2:1 to about 3:1 with respect to the hydrogen sulfide.

The catalyst of the present invention, prepared as hereinabove described, affords numerous advantages to processes for the pretreatment, or purification of hydrocarbons and mixtures of hydrocarbons. The catalyst of the present invention is preferably utilized as a fixed-bed, with the hydrocarbon charge and recycle hydrogen passing therethrough in downward flow, upward flow, or crossflow. Moving catalyst bed systems may be employed, wherein the catalyst and hydrocarbon charge are admixed prior to entering the reaction zone, followed by separation of the product from the catalyst. Depending upon the degree of the contaminant concentrations, the conditions of operation will be a liquid hourly space velocity (defined as volumes of liquid charge per hour per volume of catalyst) of about 1.0 to about 20.0, an imposed hydrogen pressure of about 100 to about 1000 pounds per square inch, and an inlet temperature to the catalyst bed within the range of about 200° F. to about 750° F. A hydrogen recycle gas stream is employed in an amount of about 1000 to about 5000 standard cubic feet per barrel of hydrocarbon charged to the process. The total reaction zone effluent is subjected to a suitable separation procedure for the purpose of removing hydrogen, hydrogen sulfide and ammonia, and other gaseous components, and recovering the normally liquid hydrocarbons as product therefrom. The hydrogen is recycled to the reaction zone, an outside source thereof being employed to replenish that hydrogen which is consumed in the saturation of olefinic hydrocarbons, and in the removal of nitrogenous and sulfurous compounds through the formation of hydrogen sulfide and ammonia.

The following examples are given for the purpose of illustrating the process of the present invention, and particularly for indicating the method by which the catalyst be employed in such process is prepared. It is understood that insignificant modifications in the conditions, reagents, and concentrations thereof employed within these examples, are not considered to be outside the broad scope of the present invention.

EXAMPLE I

In this example and those following, reference is made to a "standard relative activity" test procedure. By this method, the relative activity of a particular catalyst is defined as the ratio of the space velocity required to result in a given product improvement, while employing the test catalyst, to the space velocity required to yield the same degree of product improvement while employing a primary, standard catalyst, which relative activity is expressed as a percentage. The catalyst employed as the standard catalyst was an alumina-cobalt-molybdenum composite consisting of about 2.2% by weight of cobalt and about 5.9% by weight of molybdenum. The product quality improvement was measured in terms of the residual basic nitrogen content of the liquid product: as hereinbefore stated, the removal of nitrogenous compounds is that function of a hydrodesulfurization catalyst most difficult to effect, and, therefore, the relative activity of a given catalyst is more logically based thereon.

The relative activity test procedure consists essentially of processing a particular middle fraction of a California thermally-cracked naphtha boiling within the range of about 290° F. to about 390° F. The catalyst is placed in a reaction zone in an amount of 50 cubic centimeters, and a hydrogen pressure of 800 pounds per square inch is imposed thereon. The catalyst bed inlet temperature is maintained at a level of 700° F., and hydrogen is passed therethrough (on a once-through basis) in an amount of 3000 standard cubic feet per barrel of liquid charge. Three distinct test procedures are effected at various liquid hourly space velocities within the range of about 2 to about 10. The liquid effluent, upon which the product inspection is made, is collected over a period of operation of about 4 to about 7 hours. The thermally-cracked naphtha fraction, employed as the test charge stock, is characterized in that the concentration of the contaminants is 1.33% by weight of sulfur, 300 p.p.m. of nitrogen, and a quantity of unsaturated hydrocarbons which indicates a bromine number of 61. The basic nitrogen concentration of each of the three liquid products is plotted on a logarithmic scale against the reciprocals of the three space velocities employed. From the resulting curve, drawn through the three points, a determination is made of the reciprocal of the space velocity required to yield a liquid product having a basic nitrogen content of 2 p.p.m. The relative activity of the test catalyst is derived from the ratio of the reciprocal space velocity, to yield 2 p.p.m. nitrogen, in regard to the primary standard catalyst and compared to that of the catalyst being tested. The ratio is multiplied by a factor of 100, and a relative activity factor greater than 100% indicates a test catalyst having a greater activity than the primary standard catalyst; obviously, a catalyst having a relative activity less than 100%, is less active than the primary standard catalyst.

To illustrate an essential feature of the sulfiding technique, employed in preparing the catalyst of the present invention, two separate catalysts were prepared. The first catalyst, designated in the accompanying table as catalyst "A," was prepared by impregnating an alumina-silica carrier material (88.0% by weight alumina and 12.0% by weight of silica) with an aqueous solution containing nickel nitrate hexahydrate and sufficient molybdic acid to yield a catalyst comprising 2.23% by weight of nickel and 5.51% by weight of molybdenum. A single impregnating procedure was employed; that is, the nickel and molybdenum solutions were composited with the carrier material in a single step. The impregnated alumina-silica pills were calcined, in an atmosphere of air, at a temperature of 1100° F. for a period of 1 hour. The calcined, impregnated pills were cooled to a temperature of about 500° F. with a mixture of hydrogen and nitrogen in a 3:1 mol ratio, and hydrogen sulfide was added at this temperature, the mixture of hydrogen, nitrogen and hydrogen sulfide being recycled through the catalyst while the temperature thereof was increased to 750° F. The sulfiding was continued for a period of 1 hour at the elevated temperature of 750° F.; the composition of the sulfiding medium during this time being a 3:1 mol ratio of hydrogen to nitrogen, and a 2:1 mol ratio of hydrogen to hydrogen sulfide. It has been found that the chemical equilibrium existing between the metallic components to be sulfided, and the gaseous medium employed for the sulfiding, affects the activity and stability of the final catalytic composite through the deposition of elemental sulfur, in those instances where the hydrogen sulfide is present in the greater concentration, and particularly when the sulfiding medium is virtually 100% hydrogen sulfide. A more active catalyst is prepared when the hydrogen is of the greater concentration, and within the range of a mol ratio of about 1.5:1 to about 4:1, and more preferably from about 2:1 to about 3:1. There exist no detrimental effects as a result of the deposition of elemental sulfur when utilizing a sulfiding medium having the aforesaid composition.

After one hour at the elevated temperature of 750° F., the sulfided catalytic composite was cooled to a temperature of 300° F., and during this cooling, a positive pressure was maintained through the intermittent introduction of hydrogen sulfide, the hydrogen and nitrogen being eliminated during the cooling period. The catalyst was then further cooled to a temperature of 100° F. utilizing a stream of nitrogen.

The second catalyst, designated in the table as catalyst "B," was prepared utilizing a single impregnating procedure, as employed in the preparation of catalyst "A," and a sulfiding medium consisting of hydrogen sulfide diluted with an inert gas, nitrogen, in the absence of hydrogen. A comparison of the activities of the two catalysts indicates a substantial increase in the relative activity coefficient of the catalyst when considering the composition of the sulfiding medium. Primarily, the sole difference in the preparation of the two catalysts was the change in the sulfiding medium from a mixture of hydrogen and hydrogen sulfide, to pure hydrogen sulfide, the nitrogen being disregarded as an inert material. In addition, it should be noted that the carbon deposition, resulting from the test procedure, was significantly less in regard to catalyst "A," even though this catalyst was significantly more active.

EXAMPLE II

This example is given to illustrate another feature of the sulfiding technique according to the method of preparing the catalyst of the present invention. As hereinbefore stated, it is preferred that the catalyst, following the sulfidation at the elevated temperature of about 750° F., be maintained under a positive hydrogen sulfide pressure while being cooled to a temperature below about 300° F. The catalysts were tested in accordance with the previously described Standard Relative Activity test procedure, utilizing the California thermally-cracked naphtha fraction. The first catalyst, designated as a catalyst "C," was prepared to contain 2.0% by weight of nickel and 6.0% by weight of molybdenum. The carrier material was an alumina-silica refractory inorganic oxide with which cobalt had been coprecipitated in an amount of 0.25% by weight. The molybdenum and nickel were composited via a single impregnating procedure, and the catalyst immediately subjected thereafter to calcination and sulfidation utilizing a sulfiding medium of hydrogen and hydrogen sulfide in a 2:1 mol ratio. The catalyst was contacted with the sulfiding mixture at a temperature below about 500° F., and was maintained in contact therewith while the temperature was increased to 750° F. The catalyst was exposed to the atmosphere while being cooled to a temperature below about 300° F. As indicated in the table, the catalyst exhibited an activity coefficient of 190.

The second catalyst, designated as catalyst "D," was prepared by utilizing the sulfiding technique of the present invention, which technique includes maintaining the sulfided catalyst under a positive pressure of hydrogen sulfide, in this instance about 10.0 pounds per square inch, while being cooled from the elevated temperature to a temperature below about 300° F. This particular catalyst indicated an activity coefficient of 242, a significant increase over the activity coefficient exhibited by catalyst "C" which was exposed to an atmosphere of air while being cooled from the elevated sulfiding temperature.

EXAMPLE III

As hereinbefore set forth, one of the more common causes of catalyst deactivation is the deposition of coke and other heavy hydrocarbonaceous material which effectively shields the catalytically active centers and surfaces from the material being processed. The deposition of such carbonaceous material inherently results at least in part from excessive hydrocracking of the material being processed. It should be noted that the catalyst, described in Examples I and II, were all prepared utilizing a carrier material containing at least about 12.0% by weight of silica. The alumina-silica composite is utilized as the carrier material for hydrodesulfurization catalysts for the purpose of providing a suitable composite with which the catalytically active metallic components may be combined. However, as hereinbefore set forth, it is well known that an alumina-silica composite, in and of itself, inherently possesses a significant tendency to promote hydrocracking reactions at elevated temperatures. Thus, there is created the problem of balancing the desirability of a suitable carrier material against the detrimental effects inherently resulting therefrom. I have found that a carrier material, possessing physical characteristics which render it highly adaptable to use with catalytically active metallic components, may be prepared by combining relatively minor quantities of titania with the alumina, instead of the larger quantities of silica. The utilization of titania does not promote uncontrolled hydrocracking inherently resulting in the deposition of coke and other hydrocarbonaceous material, and, although employed in significantly lesser quantities than the silica, results in a final catalytic composite possessing a higher degree of activity in regard to the destructive removal of nitrogenous compounds.

For the purpose of illustrating the unusual benefits resulting from the utilization of an alumina-titania carrier material, a catalyst was prepared by initially commingling 73.0 grams of titanium tetrachloride and 5200 grams of an aluminum chloride solution having a specific gravity of 1.292. The titanium tetrachloride solution was employed in an amount to yield a final catalytic composite containing 3.7% by weight of titania, calculated as the oxide thereof. The mixture of titanium tetrachloride and aluminum chloride was added, accompanied by vigorous stirring to 2600 milliliters of a 28% by weight solution of ammonium hydroxide. The resulting precipitate was washed and filtered, and subsequently dried at a temperature of about 300° F. The dried composite was ground into a talc-like powder and formed into ⅛" x ⅛" cylindrical pills. The pills were then calcined, at an elevated temperature of about 1200° F., for a period of about 3 hours. The alumina-titania pills were impregnated with a single impregnating solution consisting of 11.8 grams of nickel nitrate hexahydrate dissolved in 12 milliliters of ammonium hydroxide, and 11.8 grams of molybdic acid (85% by weight $MoO_3$) dissolved in 25 milliliters of water plus 10 milliliters of ammonium hydroxide. The resultant solution was diluted to a total volume of 54 milliliters, and commingled with 50 grams of the alumina-titania cylindrical pills. The thus impregnated composite was dried for a period of 3 hours at a temperature of 300° F., and subsequently calcined for a period of 1 hour at a temperature of 1100° F.

The dried, impregnated alumina-titania pills were purged with a stream of nitrogen, at an elevated calcination temperature of 1100° F. for the purpose of purging the composite of any free oxygen remaining from the calcination procedure, and to cool the oxidized composite to a temperature of about 400° F. A gaseous mixture of hydrogen sulfide and hydrogen, having a mol ratio of hydrogen to hydrogen sulfide of 2:1 was passed through the catalyst while the temperature thereof was increased to a level of 750° F. After a period of one hour, the sulfiding stream was discontinued, and the catalyst cooled to a temperature of about 300° F.; during the period of cooling, from the sulfiding temperature of 700° F. down to 300° F., a positive pressure of about 10 pounds per square inch was maintained upon the sulfided catalyst through the intermittent introduction of 100% hydrogen sulfide. After the catalyst temperature had reached a level of 300° F., a stream of nitrogen was introduced for the purpose of purging the same of any possible residual hydrogen sulfide and/or hydrogen, and to further cool the catalyst for the purposes of handling. This catalyst, designated in the accompanying table as catalyst "E," was subjected to the previously described standard relative activity test procedure.

*Tabulated data: relative activity coefficients*

| Catalyst Designation | A | B | C | D | E |
|---|---|---|---|---|---|
| Catalyst Composition, wt. percent: | | | | | |
| Nickel | 2.23 | 2.22 | 2.0 | 2.0 | 2.0 |
| Molybdenum | 5.51 | 6.43 | 6.0 | 6.0 | 6.0 |
| Cobalt | | | 0.25 | 0.25 | |
| Sulfiding Technique (Components Present): | | | | | |
| Nitrogen | x | x | | | |
| Hydrogen | x | | x | x | x |
| Hydrogen Sulfide | x | x | x | x | x |
| Relative Activity Data: | | | | | |
| Activity Coefficient | 216 | 142 | 190 | 242 | 237 |
| Carbon Deposition, wt. percent | 0.60 | 0.90 | | | 0.29 |

The benefits resulting from the utilization of alumina-titania as a carrier material are immediately ascertained upon reference to the tabulated data. The catalyst of the present invention, catalyst "E," possessed a relative activity coefficient of 237, which is significantly in excess of the activity indicated by the other catalysts which utilized only nickel and molybdenum as the active metallic components, and in addition, resulted in the deposition of only 0.29% by weight of coke and other carbonaceous material. The utilization of titania has been shown to result in a catalyst possessing a high degree of activity, in regard to the destructive removal of nitrogenous compounds, while effectively inhibiting the hydro-cracking reactions which inherently result in the excessive deposition of coke and other heavy hydrocarbonaceous material. Therefore, the catalyst of the present invention may be expected to function in the desired manner for an extended period of time.

The foregoing examples clearly illustrate the several embodiments of the process of the present invention for the manufacture of the catalytic composite to be utilized therein. The benefits afforded to processes for the purification, or treating, of various hydrocarbons and hydrocarbon mixtures are indicated. The process of the present invention, employing a particular catalyst, results in a hydrocarbon product which is substantially completely free from the various contaminants which otherwise prohibit the immediate, direct further processing of such hydrocarbons, and enjoys a relatively extended period of processing as a direct result of the high degree of stability possessed by the catalytic composite employed therein.

I claim as my invention:

1. A process for the purification of hydrocarbons and mixtures of hydrocarbons, containing undesirable contaminants, which comprises contacting said hydrocarbons, in a hydrogenation reaction zone, with a hydrodesulfurization catalyst containing at least one metallic component selected from the metals of groups VI–A and VIII of the periodic table, existing as the sulfide thereof, and composited with an alumina-titania carrier material, said catalyst having been prepared by sulfiding a composite of alumina, titania and an oxide of said metallic component with a gaseous mixture of hydrogen sulfide and hydrogen over a temperature range increasing from about 400° F. to about 750–800° F. and thereafter cooling the sulfided composite to below 400° F. while maintained under a positive pressure of hydrogen sulfide, removing a mixture of normally gaseous material and saturated, normally liquid hydrocarbons from said hydrogenation reaction zone, and thereafter separating said mixture into a gaseous phase and a liquid phase substantially free from the aforesaid undesirable contaminants.

2. The process of claim 1 further characterized in that said catalyst comprises the sulfides of nickel and molybdenum.

3. The process of claim 1 further characterized in that said catalyst comprises the sulfides of nickel, molybdenum and cobalt.

4. A process for the purification of hydrocarbons and mixtures of hydrocarbons, containing undesirable contaminants, which comprises contacting said hydrocarbons, in a hydrogenation reaction zone, with a hydrodesulfurization catalyst maintained under an imposed hydrogen pressure; said hydrodesulfurization catalyst containing the sulfides of molybdenum and nickel, composited with an alumina-titania carrier material, and having been prepared by sulfiding an alumina-titania-molybdenum oxide-nickel oxide composite with a gaseous mixture of hydrogen sulfide and hydrogen over a temperature range increasing from about 400° F. to about 750–800° F. and thereafter cooling the sulfided composite to below 400° F. while maintained under a positive pressure of hydrogen sulfide; removing a mixture of normally gaseous material and saturated normally liquid hydrocarbons from said hydrogenation reaction zone, and thereafter separating said mixture into a gaseous phase and a liquid phase substantially free from the aforesaid undesirable contaminants.

5. A process for the purification of hydrocarbons and mixtures of hydrocarbons, contaminated by sulfurous and nitrogenous compounds, which comprises passing said contaminated hydrocarbons into a hydrogenation reaction zone, maintained under an imposed hydrogen pressure in excess of about 100 pounds per square inch and containing a hydrodesulfurization catalyst comprising an alumina-titania carrier material composited with the sulfides of molybdenum and nickel, removing a mixture of normally liquid hydrocarbons and normally gaseous material containing hydrogen sulfide and ammonia from said hydrogenation reaction zone, thereafter subjecting said mixture to separation to recover said liquid hydrocarbons substantially free from the aforesaid sulfurous and nitrogenous compounds; said hydrodesulfurization catalyst characterized by the method of preparation which comprises sulfiding an alumina-titania carrier material, composited with the oxides of molybdenum and nickel, with hydrogen sulfide containing hydrogen in excess of a mol ratio of about 1.5:1 with respect to said hydrogen sulfide over a temperature range increasing from about 400° F. to about 750–800° F. and thereafter cooling the sulfided composite to below 400° F. while maintained under a positive pressure of hydrogen sulfide.

6. The process of claim 5 further characterized in that said hydrodesulfurization catalyst contains cobalt sulfide in an amount of from about 0.1% to about 0.7% by weight, calculated as elemental cobalt.

References Cited in the file of this patent

UNITED STATES PATENTS

| | | |
|---|---|---|
| 2,880,171 | Flinn et al. | Mar. 31, 1959 |
| 2,905,636 | Watkins et al. | Sept. 22, 1959 |